United States Patent
Hanson et al.

(10) Patent No.: US 9,586,753 B2
(45) Date of Patent: Mar. 7, 2017

(54) MOVABLE REUSABLE CONTAINMENT STRUCTURE FOR FLEXIBLE FLUID CONTAINMENT VESSEL

(71) Applicants: Ken Hanson, Oakesdale, WA (US); Karen Hanson, Oakesdale, WA (US); Chris Hanson, Colfax, WA (US); Scott Ackerman, Colfax, WA (US)

(72) Inventors: Ken Hanson, Oakesdale, WA (US); Karen Hanson, Oakesdale, WA (US); Chris Hanson, Colfax, WA (US); Scott Ackerman, Colfax, WA (US)

(73) Assignee: Ken Hanson, Oakesdale, WA (US)

( * ) Notice: Subject to any disclaimer, the term of this patent is extended or adjusted under 35 U.S.C. 154(b) by 0 days.

(21) Appl. No.: 14/716,789

(22) Filed: May 19, 2015

(65) Prior Publication Data

US 2015/0329285 A1 Nov. 19, 2015

Related U.S. Application Data

(60) Provisional application No. 62/000,380, filed on May 19, 2014.

(51) Int. Cl.
| | |
|---|---|
| *B65D 90/02* | (2006.01) |
| *B65D 90/24* | (2006.01) |
| *B65D 90/20* | (2006.01) |
| *B65D 81/18* | (2006.01) |
| *B65D 81/38* | (2006.01) |
| *B65D 90/08* | (2006.01) |
| *B65D 88/54* | (2006.01) |
| *B65D 88/12* | (2006.01) |
| *B65D 88/74* | (2006.01) |

(Continued)

(52) U.S. Cl.
CPC .......... *B65D 90/24* (2013.01); *B65D 81/18* (2013.01); *B65D 81/3825* (2013.01); *B65D 88/12* (2013.01); *B65D 88/54* (2013.01); *B65D 88/744* (2013.01); *B65D 88/748* (2013.01); *B65D 90/046* (2013.01); *B65D 90/08* (2013.01); *B65D 90/20* (2013.01); *B65D 90/205* (2013.01); *B65D 2590/046* (2013.01); *Y02W 30/807* (2015.05)

(58) Field of Classification Search
CPC .......... B65D 2590/046; B65D 90/048; B65D 90/046; B65D 61/00; B65D 88/744; B65D 88/54; B65D 88/12; B65D 90/08; B65D 90/20; B65D 81/18; B65D 81/3825; B65D 90/24; B65D 90/205
USPC .. 220/9.1, 9.2, 1.6, 562, 647, 648, 4.16, 565
See application file for complete search history.

(56) References Cited

U.S. PATENT DOCUMENTS

| | | | | |
|---|---|---|---|---|
| 4,119,263 A | * | 10/1978 | Cuthbertson | ........ B65D 5/4208 |
| | | | | 222/528 |
| 4,640,328 A | * | 2/1987 | Arney | ................ B65D 88/1656 |
| | | | | 220/565 |

(Continued)

*Primary Examiner* — J. Gregory Pickett
*Assistant Examiner* — Niki M Eloshway
(74) *Attorney, Agent, or Firm* — Randall Danskin P.S.

(57) ABSTRACT

A movable reusable frame-like structure for supporting, containing and protecting a flexible fluid containment vessel for use in hydraulic fracturing operations to store fluids, said structure having a base frame carrying plural vertical supports, the plural vertical supports interconnected by plural support straps to define a volume above the base frame carrying a secondary containment, and a flexible fluid containment vessel within the secondary containment.

2 Claims, 7 Drawing Sheets

(51) Int. Cl.
*B65D 90/04* (2006.01)
*B65D 90/00* (2006.01)

(56) References Cited

U.S. PATENT DOCUMENTS

| | | | | |
|---|---|---|---|---|
| 5,653,354 | A * | 8/1997 | Olson | B65D 90/205 |
| | | | | 206/511 |
| 6,090,281 | A * | 7/2000 | Buckner | A23L 2/50 |
| | | | | 210/149 |
| 6,098,744 | A * | 8/2000 | Kawamura | B65D 90/06 |
| | | | | 181/198 |
| 6,516,965 | B1 * | 2/2003 | Perkins | B65D 77/061 |
| | | | | 220/1.5 |
| 6,533,137 | B2 * | 3/2003 | Gervais | B65D 88/62 |
| | | | | 220/1.6 |
| 6,955,273 | B2 * | 10/2005 | Hartwall | B65D 19/18 |
| | | | | 220/1.6 |
| 7,213,970 | B1 | 5/2007 | Reicin et al. | |
| 7,431,173 | B2 * | 10/2008 | Thorpe | B65D 19/385 |
| | | | | 206/511 |
| 7,503,885 | B2 | 3/2009 | Reicin et al. | |
| 8,083,169 | B2 | 12/2011 | Martin et al. | |
| 8,555,656 | B2 * | 10/2013 | Al-Qaffas | F25B 21/04 |
| | | | | 220/592.17 |
| 9,138,604 | B2 * | 9/2015 | Cleary | A62C 3/0235 |
| 2012/0087760 | A1 * | 4/2012 | Sims | B65D 90/0053 |
| | | | | 410/52 |
| 2015/0048083 | A1 | 2/2015 | Kral et al. | |

* cited by examiner

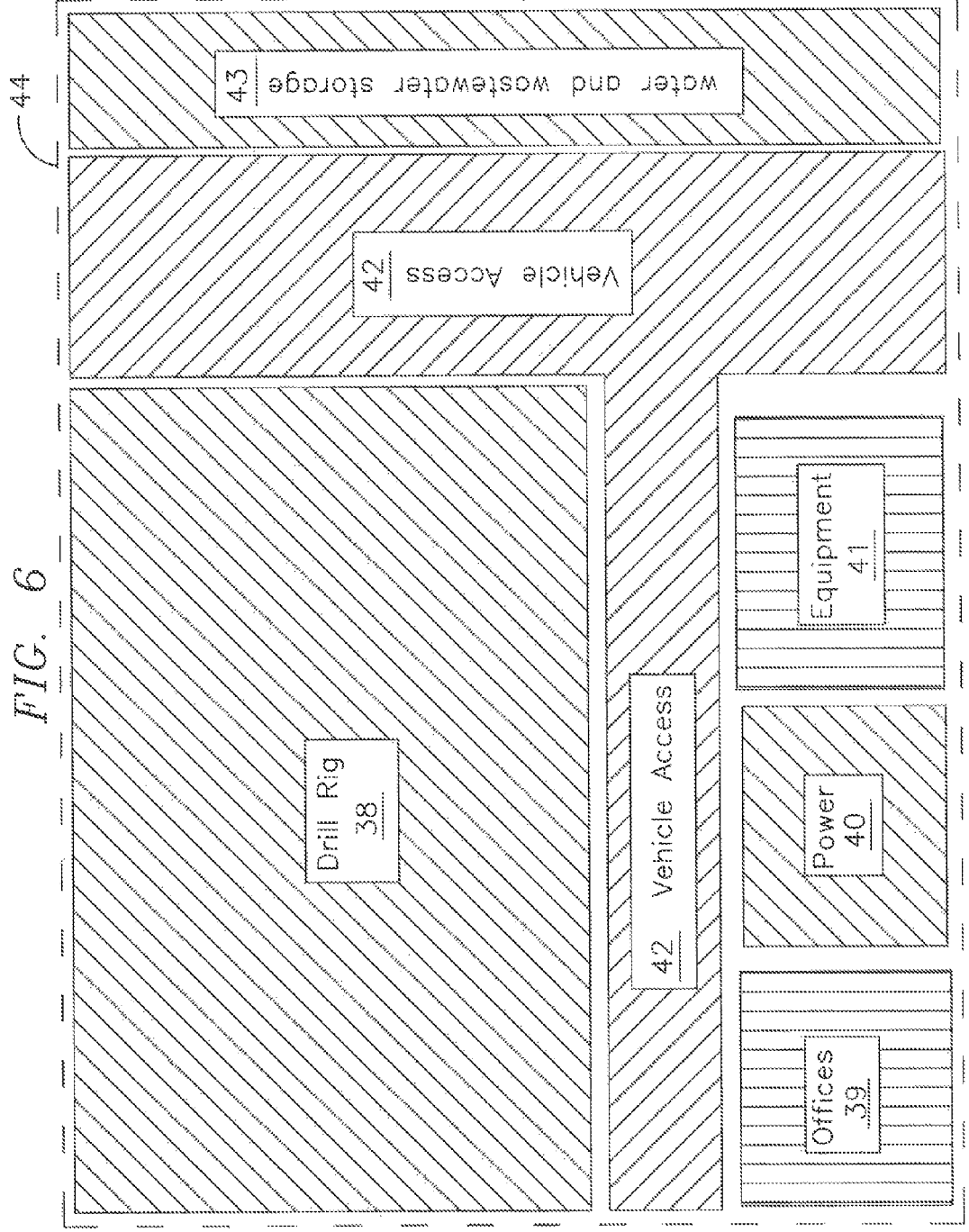

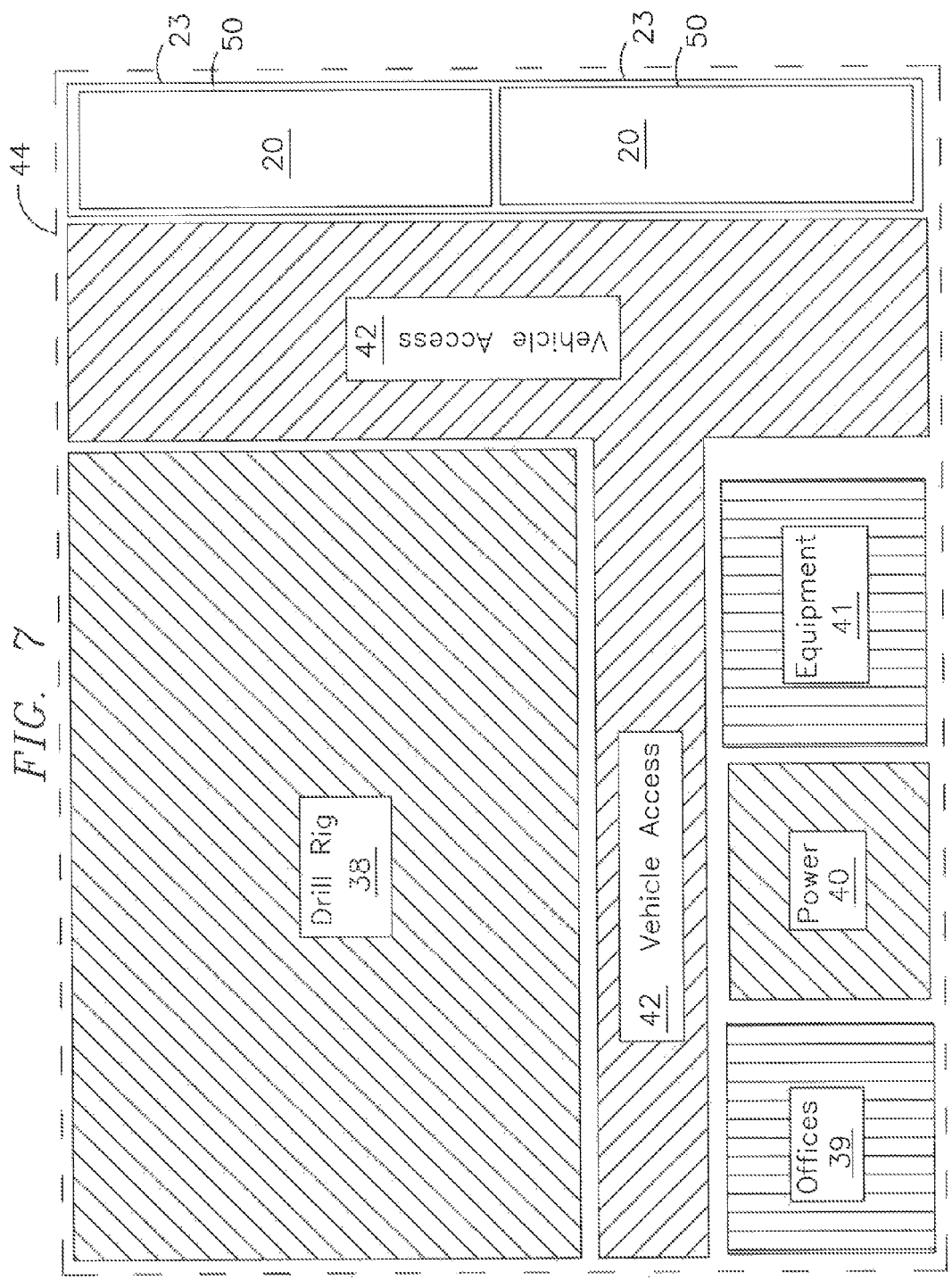

MOVABLE REUSABLE CONTAINMENT STRUCTURE FOR FLEXIBLE FLUID CONTAINMENT VESSEL

RELATED APPLICATIONS

This utility patent application claims the benefit of earlier filed U.S. Provisional Patent Application No. 62/000,380 titled MOVABLE REUSABLE FLEXIBLE FLUID CONTAINMENT VESSEL STRUCTURE filed on May 19, 2014. The entire contents of said earlier filed U.S. Provisional Patent Application No. 62/000,380 is expressly incorporated herein by this reference. Said U.S. Provisional Patent Application No. 62/000,380 is also properly referenced in the Application Data Sheet (ADS) filed herewith.

BACKGROUND OF INVENTION

Field of Invention

The present invention relates generally to containment vessels and more particularly to a movable reusable frame-like structure to surround and support a flexible bladder type fluid containment vessel for use in hydraulic fracturing operations.

Background

Induced hydraulic fracturing or hydro-fracturing, commonly known as "fracking", is a technique in which water is mixed with sand and chemicals, and the mixture (fracturing fluid) is injected at high-pressure into a well bore to create small fractures (typically less than 1 mm), along which desirable fluids including gas, petroleum and hydrocarbons may migrate to the well for collection and harvesting.

The hydraulic fractures are created by pumping the fracturing fluid into the well bore at a rate sufficient to increase down hole pressure above the fracture gradient (pressure gradient) of the rock. The rock cracks and the fracturing fluid continues propagating into the rock, extending the crack still further. Introducing a proppant, such as grains of sand, ceramic, or other particulates, into the fracturing fluid prevents the fractures from closing upon themselves when the pressure of the fracturing fluid is removed.

Hydraulic fracturing equipment usually consists of a slurry blender and one or more high-pressure high-volume fracturing pumps, a monitoring unit and associated equipment including fracturing fluid tanks, vessels for the storage and handling of proppant, a variety of testing, metering and flow rate equipment and storage tanks and/or ponds for fresh water and waste water. Typically, fracturing equipment operates in high-pressure ranges up to 15,000 psi and at high volume rates of 9.4 ft.$^3$ per second (approximately 100 barrels of fluid per minute). Because of the high volume of fluids and water used in the fracking process, it is necessary that large volumes of water be readily available for injection into the well, and also that the well site have facilities for capturing and storing and perhaps recycling the waste water ejected from the well.

The fluid injected into the well is typically a slurry of water, proppants, and chemical additives comprising approximately 90% water, about 9.5% sand and approximately 0.5% chemical additives. The typical fracturing treatment uses between 3 and 12 chemical additives which may include: acids, sodium chloride, poly acrylamide, ethylene glycol sodium carbonate, potassium carbonate, flutaraldehyde, guar gum, citric acid and isopropanol.

The fracking process produces "wastewater," also known as "flow back water" or "produced water" which is returned to the surface during the fracturing process and after the fracking process is completed. The fracking process typically requires between two and five million gallons of freshwater (also called "sweet water") per well. Approximately 10%-40% of the fluid that is pumped into the well returns to the surface as wastewater which may contain a variety of contaminants including hydrocarbons, carbon dioxide, hydrogen sulphide, nitrogen, helium, harmful elements such as mercury, arsenic, and lead, particulates, chemicals and salts. Wastewater production commonly averages between 3,000 barrels and 5,000 barrels per day at 42 gallons per barrel. (126,000-210,000 gallons).

During fracking operations, the fresh water (sweet water) is typically held in tank trucks or plastic lined ponds/depressions dug into the ground proximate the well, and plumbing apparatus is used to withdraw the fresh water from the tanks/ponds and supply it to blenders or other apparatus for adding proppants and chemicals prior to the slurry being pumped to the well head for high pressure injection down the well.

Following the injection of the slurry into the well, the wastewater exits out the well bore and is typically pumped into wastewater storage tanks or into wastewater ponds that are lined with plastic, or the like, to prevent the wastewater from leaching into the ground. After fracking is complete, the wastewater storage tanks and/or wastewater storage ponds are drained and the waste water is transported to salt water dumps (SWDs) or hazardous water sites for permanent disposal.

In the Marcellus Shale deposit it is estimated to cost more than $3 per barrel to dispose the wastewater and $7 to $10/per barrel to transport wastewater to a disposal site. There is also a cost for fresh water needed for fracking. In drought areas, fresh water is a large cost factor. For example a horizontal well may use approximately 4.2 million gallons of fresh water.

Fresh water sourcing is becoming a revenue business as some municipalities and landowners in the western US are selling water rights to the drilling industry for fracking.

It is estimated in the near future, fracking operators may have to pay as much as $6,000.00 for a disposal charge per tank load excluding the transporting cost of getting the wastewater to the dump site.

There are four primary methods for dealing with the wastewater, and all four primary methods require a means/apparatus for storing and/or containing the water. A first method reuses the wastewater in the fracking process. Unfortunately, reuse is problematic as high levels of contaminants may plug the well with "residual chemicals", particulates, or "shale fines" which may negatively impact production of the well.

A second method is "deep well injection," which entails drilling a deep disposal well into which the wastewater is pumped for permanent disposal. However, this option too is problematic, as seismologists and the scientific community have alleged earthquakes "were almost certainly induced by the disposal of fracking wastewater in deep disposal wells." The drilling of a disposal well is also expensive.

A third method is on-site treatment of the wastewater which is designed to remove the most harmful chemicals and byproducts from the wastewater. The treated water may then be reused in fracking. On-site treatment generally has negligible transportation costs, but may be more expensive than other treatment options due to the necessary equipment and facilities for treatment and the need for space to accommodate the treatment equipment.

The fourth method is off-site treatment and disposal of the wastewater. This fourth option is the most expensive as transportation costs and disposal costs may be enormous.

As previously noted, all four of the primary methods for handling the wastewater require a means/apparatus to store or otherwise contain the wastewater for some period of time. Because hydraulic fracturing may produce upwards of 5,000 barrels of wastewater per day per well, the storage capacity must be large and readily available during the fracking operation.

The huge volume of water that must be available and handled/processed during fracking operations, many of which occur in arid and semiarid areas, is another significant burden that must be addressed.

Enormous volumes of fresh water/sweet water must be available and easily accessible at all times.

Fresh water supplies must be kept separate from waste water storage to prevent contamination of the fresh water.

Evaporation loss must be minimized/eliminated.

Open access to the waste water, such as in a settling pond, creates risks to the environment and wildlife which may try to drink the contaminated waste water.

In geographic areas that experience low temperatures, open ponds may freeze reducing the quantity of available fluidic water for operations unless the water is heated.

Steel wall and/or concrete tanks may contain the water and reduce/eliminate open access and evaporation, but are expensive to construct and are generally permanent and therefore are not re-usable.

Water retaining pits may be excavated and thereafter lined with a liner or similar fluid impermeable barrier, but such pits are hazardous, expensive to construct, create plumbing complexities and are difficult to monitor for leakage. Further such pits must typically be "filled in" after the fracking operation is completed which further increases costs and may lead to environmental scarring.

Space is at a premium on fracking sites and therefore use of large amounts of surface area for water storage reduces space required for essential equipment and supplies.

Flexible storage tanks, or "pillow tanks" such as those described in U.S. Pat. No. 7,213,970 to Reicin, et al. issued May 8, 2007 are known, but heretofore such fluid storage tanks have not been used in the fracking industry. Such fluid storage tanks are commonly used by the United States military to store aviation fuels, potable water, waste water and the like at remote locations where it is impractical to erect permanent fluid storage tanks. Such fluid storage tanks are preferable to the military because of their transportability, reusability, ease of set up and small size when not filled with fluid. However, the United States Government also benefits from the legal doctrine of sovereign immunity and is therefore generally immune from liability if such tanks rupture, burst or leak their contents onto the ground causing pollution/contamination. Fracking operators are not entitled to such immunity and therefore use of such flexible storage tanks for containment of wastewater is an endeavor that is "fraught" with significant risk. This is especially true when numerous large vehicles may be moving on and about the drill site which is often small and contained and filled with hazardous moving machinery and equipment.

What is needed is a reusable erectable fluid storage containment structure that is configurable to be erected in oddly shaped areas of a fracking site to contain fresh water and to contain waste water while protecting the workers, the environment, wildlife and the fracking operation. The containment must have a primary containment and a secondary containment for safety redundancy and be secure, stable, safe and transportable and is reusable for use at site after site.

Our invention overcomes these difficulties and minimizes the risks by providing a removable reusable structure that surrounds, supports and protects a flexible fluid storage vessel, the structure containing a secondary containment for safety redundancy and the structure providing lateral and vertical support for the flexible fluid storage vessel and for the secondary containment to "contain" the vessel at a specific location at a fracking site which may need to be located, due to space restrictions, in an area having a configuration that is not suitable for known fluid storage.

Our invention resolves various of these aforementioned problems by providing an apparatus for large capacity fluid storage vessels to be erected on site to store fresh water for, as well as to store waste water from, hydro-fracking operations.

Some or all of the problems, difficulties and drawbacks identified above, and other problems, difficulties, and drawbacks may be helped or solved by the inventions shown and described herein. Our invention may also be used to address other problems, difficulties, and drawbacks not set out above or which are only understood or appreciated at a later time. The future may also bring to light currently unknown or unrecognized benefits which may be appreciated, or more fully appreciated, in the future associated with the novel inventions shown and described herein.

BRIEF SUMMARY OF THE INVENTION

A movable reusable frame-like structure for supporting, containing and protecting a flexible fluid containment vessel for use in hydro-fracking operations to store fluids, said structure having a base frame carrying plural vertical supports, the plural vertical supports interconnected by plural support straps to define a volume above the base frame carrying a secondary containment, and a flexible fluid containment vessel within the secondary containment.

In providing such a fluid containment structure it is:

a principle object to provide a structure for securely containing and securing fluids.

a further object to provide such a structure for containing, supporting and protecting fluids at a hydraulic fracking site.

a further object to provide such a structure having a secondary containment means to prevent leaks and to provide safety redundancy.

a further object to provide such a structure having a framework around flexible bladder pillow tank to provide support, containment and protection to the pillow tank.

a further object to provide such a structure having a framework that may be assembled and disassembled on site.

a further object to provide such a structure that is reusable.

a further object to provide such a structure that may be installed along an edge of a fracking site where surface area is limited.

a further object to provide such a structure that may be heated.

a further object to provide such a structure that protects wildlife.

a further object to provide such a structure that prevents fluid loss.

a further object to provide such a structure that protects the environment.

a further object to provide such a structure that is size configurable.

a further object to provide such a structure that allows plural pillow tanks to be stacked vertically.

a further object to provide such a structure that allows plural pillow tanks to be contained horizontally.

a further object to provide such a structure that may be disassembled when not in use to conserve space/storage.

a still further object to provide such a structure that may be easily interconnected to components of a hydraulic fracking operation to prevent spills and leaks.

Other and further objects of our invention will appear from the following specification and accompanying drawings which form a part hereof. In carrying out the objects of our invention it is to be understood that its structures and features and steps are susceptible to change in design and arrangement and order with only one preferred and practical embodiment of the best known mode being illustrated in the accompanying drawings and specified as is required.

BRIEF DESCRIPTION OF THE DRAWINGS

Preferred forms, configurations, embodiments and/or diagrams relating to and helping to describe preferred aspects and versions of our invention are explained and characterized herein, often with reference to the accompanying drawings. The drawings and features shown herein also serve as part of the disclosure of our invention, whether described in text or merely by graphical disclosure alone. The drawings are briefly described below.

FIG. 6 is a plan view sketch of a typical fracking well drill site showing the orientation and placement of various structures and facilities within the boundaries of the site showing fresh water and waste water containment along one end portion of a typical fracking site.

FIG. 7 is a plan view sketch, similar to that of FIG. 6, showing how our containment structure might be situated and oriented on the well drill site to utilize otherwise unusable space.

FIG. 8 is an enlarged orthographic partial cut-away side view of one embodiment of a horizontal support strap connection carried by a vertical support and carrying a support band in a loop.

DETAILED WRITTEN DESCRIPTION

Introductory Notes

Figure 1:
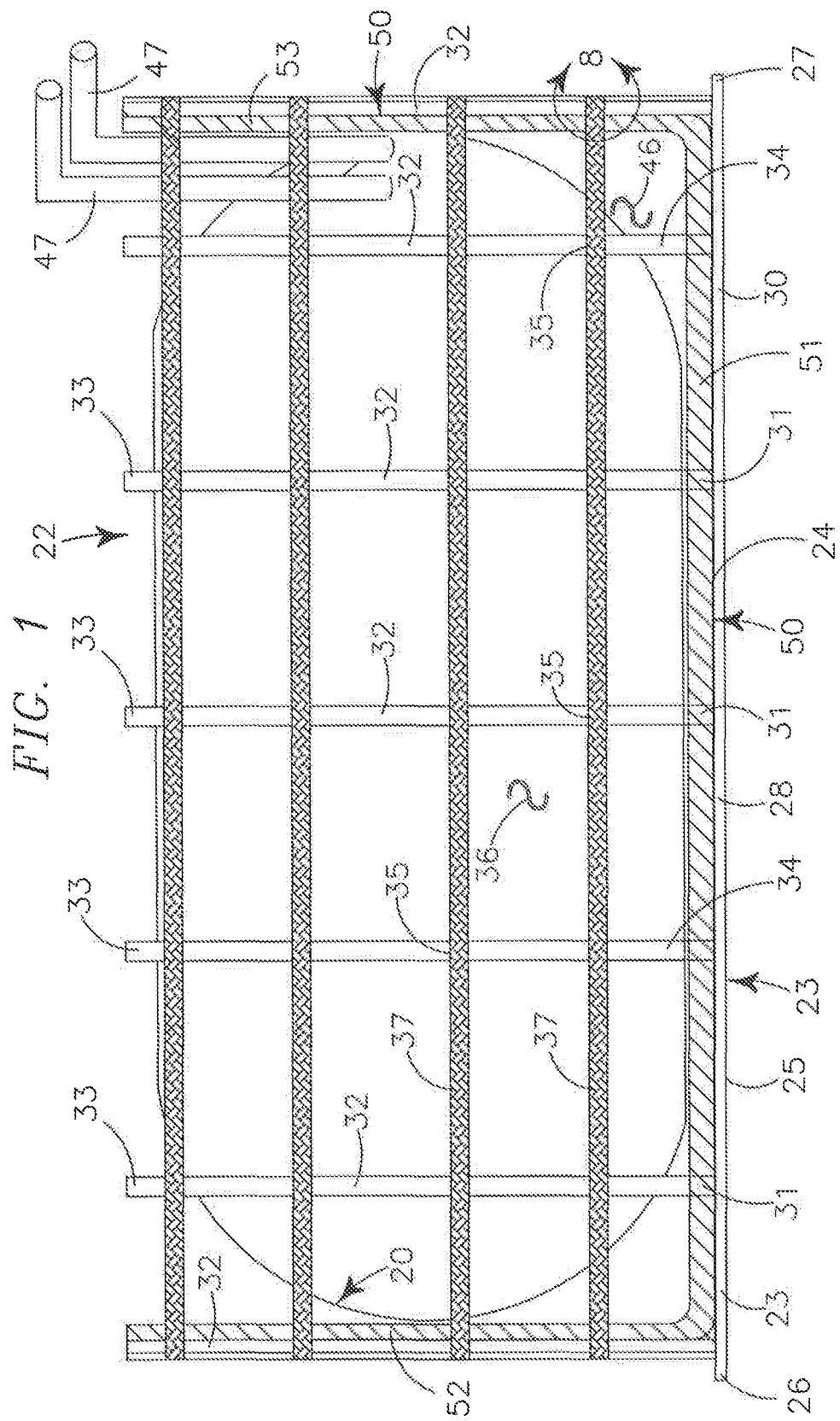
FIG. 1 is an orthographic side view of a representative configuration of our fluid vessel containment structure showing a pillow tank contained within the containment frame and within the secondary containment.

The readers of this document should understand that dictionaries were used in the preparation of this document. Widely known and used in the preparation hereof are; *The American Heritage Dictionary*, (4th Edition© 2000), *Webster's New International Dictionary*, Unabridged, (Second Edition©1957), *Webster's Third New International Dictionary* (© 1993), *The Oxford English Dictionary* (Second Edition, ©1989), *The New Century Dictionary* (©2001-2005) and WikiPedia.com, all of which are hereby incorporated by this reference for Interpretation of terms used herein, and for application and use of words defined in such references to more adequately or aptly describe various features, aspects and concepts shown or otherwise described herein using words having meanings applicable to such features, aspects and concepts.

This document is premised upon using one or more terms with one embodiment that may also apply to other embodiments for similar structures, functions, features and aspects of the inventions. Wording used in the Claims is also descriptive of the inventions, and the text of both Claims and Abstract are incorporated by this reference into the description entirely.

The readers of this document should further understand that the embodiments described herein may rely on terminology and features used in any section or embodiment shown in this document and other terms readily apparent from the drawings and language common or proper therefore.

Our movable reusable flexible fluid containment vessel structure generally provides a containment frame 22, a pillow tank 20, and a secondary containment 50.

The pillow tank 20 is of known construction, such as the flexible fluid storage vessel disclosed in U.S. Pat. No. 7,213,972 Reicin, et al. issued May 8, 2007. The pillow tank 20 functions as a flexible fluid storage vessel having a top portion (not shown) and a bottom portion (not shown) interconnected at adjacent peripheral edge portions (not shown) forming a body defining a fluid tight volume 36 therein. A valve assembly (not shown) communicates with the fluid tight volume 36 through the material forming the pillow tank 20. The valve assembly (not shown) is configured to communicate with known plumbing connections to allow fluids contained within the volume 36 to pass outwardly through the valve and also for fluids to be pumped into the volume 36. Pillow tanks 20 are commonly used for temporary storage of potable water, aviation fuels, and the like and are commonly employed by the US military during operations in remote locations and by organizations such as the Red Cross® for disaster relief operations.

The secondary containment 50 is similar in configuration to a swimming pool liner and has a bottom portion 51, a first end portion 52, a second end portion 53, a first side portion 54 and a second side portion 55. The secondary containment 50 may, in some embodiments, also have a top portion (not shown) but a top portion (not shown) is not required and the secondary containment 50 may have an open top. The bottom portion 51, the first end portion 52, the second end portion 53, the first side portion 54 and the second side portion 55 are all interconnected at adjacent edge portions in a manner that provides a fluid tight, and fluid impermeable, interconnection. The side to side dimension, the end-to-end dimension and the height dimension dimensions of the secondary containment 50, may be varied, but in the preferred embodiment closely match the related dimensions of the containment frame 22. Although the Figures show the secondary containment 50 to have either a rectilinear configuration or a cylindrical configuration, it is contemplated the secondary containment 50 may be customized into nearly any configuration to accommodate the needs of any particular fracking site.

The containment frame 22 has a base frame 23 having a top portion 24 and a bottom portion 25, a first end portion 26, a second end portion 27, a first edge portion 28, a second edge portion 29 and has a peripheral edge portion 30 extending thereabout. The base frame 23 may be generally planar and continuous formed of a single planar member (not shown) or may be formed from plural interconnected panels (not shown) forming an aerially larger base frame 23. The base frame 23 may also be generally grid-like in configuration (not shown) formed of plural interconnecting elongate members (not shown).

Plural vertical support pockets 31 are defined in and spacedly arrayed about the base frame 23 preferably spacedly adjacent the peripheral edge 30, and each vertical support pocket 31 defines an orifice in which a vertical support 32 may be inserted and be positionally maintained therein. In the preferred embodiment each vertical support pocket 31 is rectilinear in configuration and each vertical support 32 is a box beam having width and thickness dimensions that allows the vertical support 32 to be securely carried within the vertical support pocket 31. The bottom end portions 34 of the vertical supports 32 and vertical support pockets 31 may have configurations other than square/rectilinear such as, but not limited to, oval or round or otherwise.

Each vertical support 32 and has a top end portion 33, a bottom end portion 34 and carries at least one support strap connection 35 and preferably plural spaced apart support strap connections 35, spacedly arrayed between the top end portion 33 and the bottom end portion 34. The support strap connection 35 may be a loop, (FIG. 8), a groove, a hole, an appendage or other instrumentality that is configured to releasably and yet securely engage with and positionally maintain a support band 37. In the preferred embodiment, the support band 37 is a nylon strap, such as those straps used to secure loads on large commercial trucks. In an alternative embodiment, it is contemplated the support band 37 may also be a chain or other strong flexible elongate member such as, but not limited to cable.

Having described the structure of our Movable Reusable Containment Structure for Flexible Fluid Containment Vessel its operation may be understood.

As shown in the Figures, the containment frame 22 may be positioned within the site boundary 44 of the fracking site at a desired position proximate to a drilling rig 38, offices 39, power supplies 40, necessary equipment, fuel and storage 41 and vehicle access roads 42. The containment frame 22 may also be positioned/assembled on one or more movable structures such as, but not limited to, flat bed trailers. (not shown).

Figure 2:
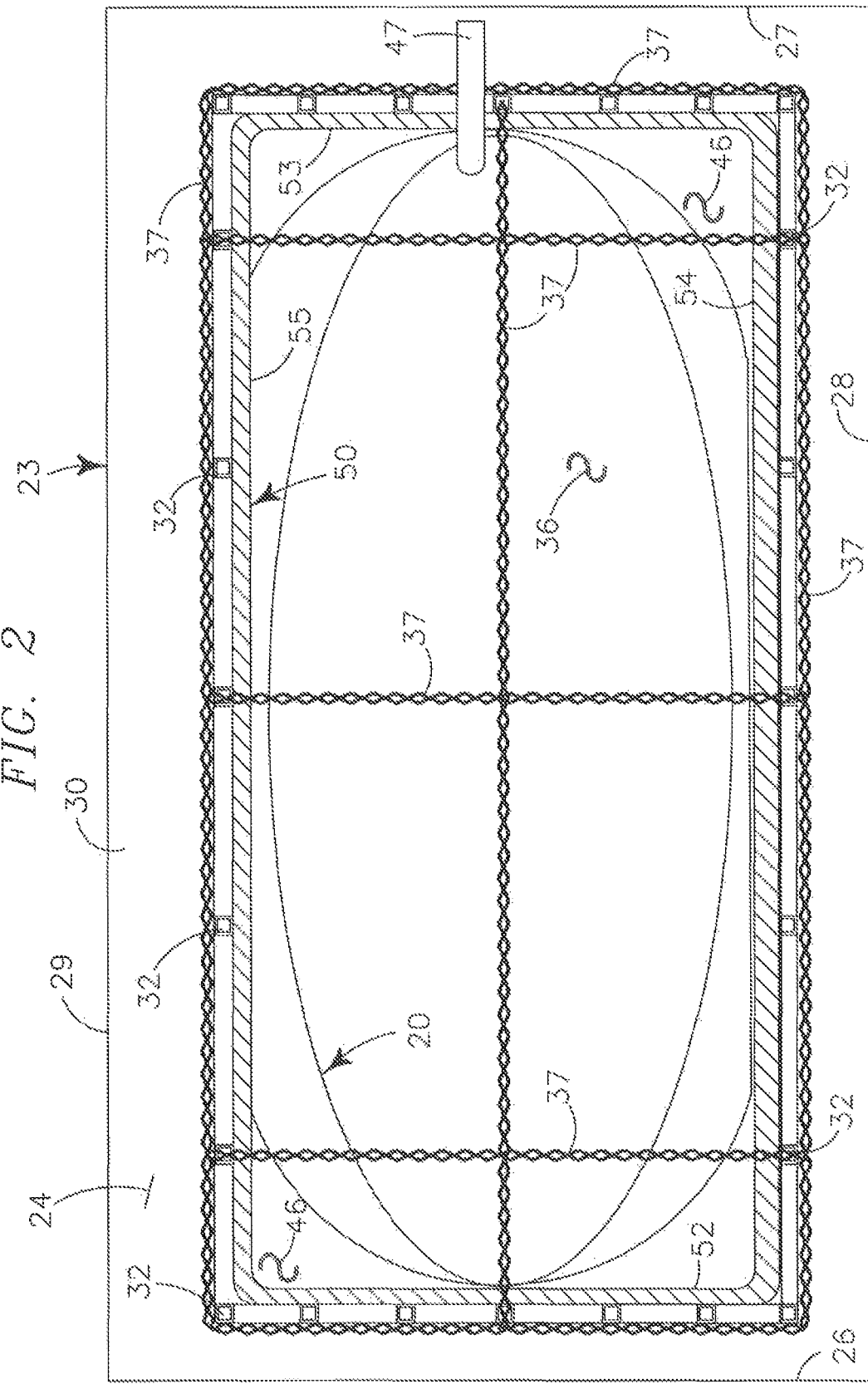
FIG. 2 is an orthographic plan view of the containment structure of FIG. 1 showing chains being used for support straps.
Figure 3:
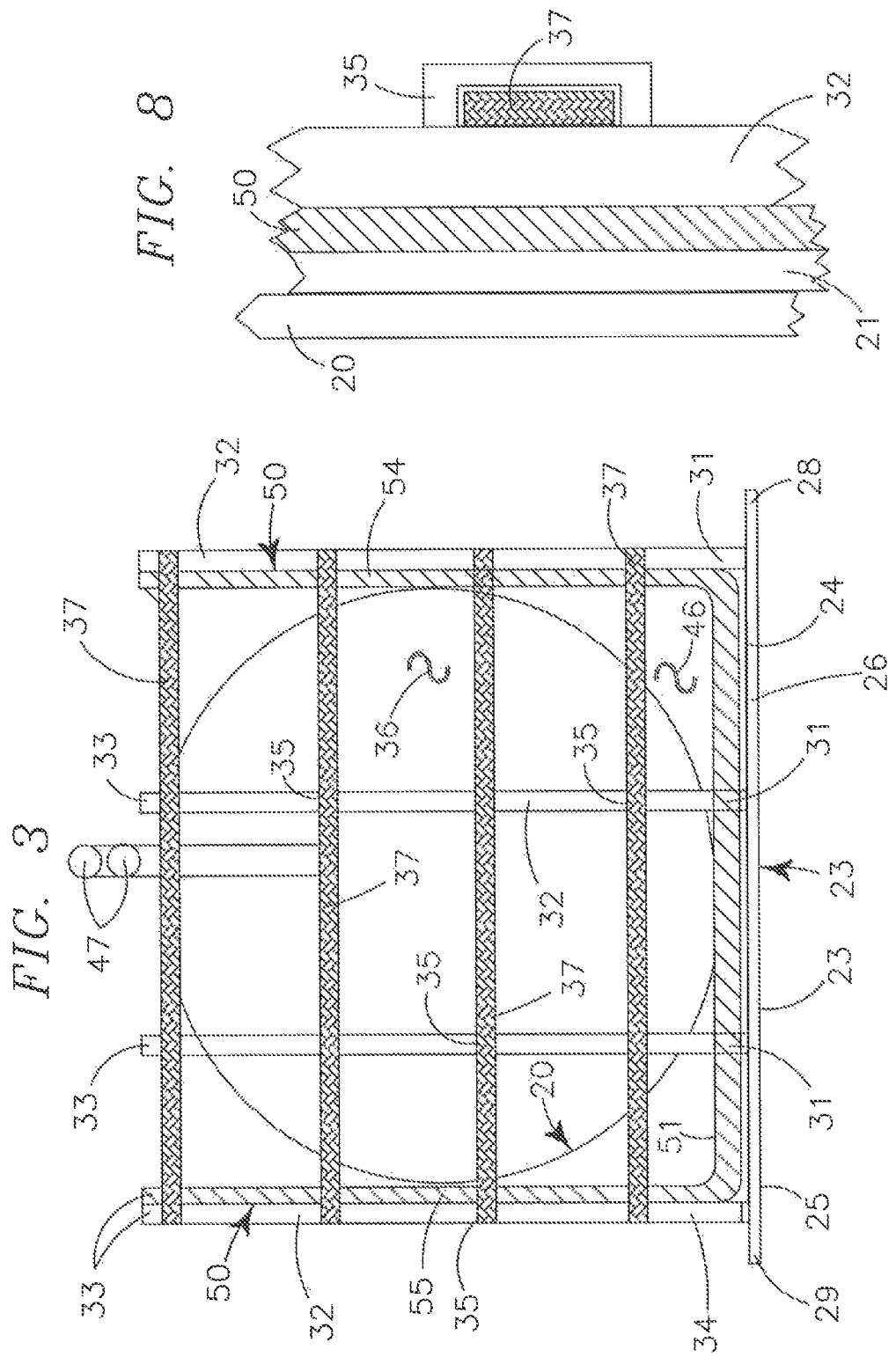
FIG. 3 is an orthographic end view of the containment structure of FIG. 1.
Figure 4:
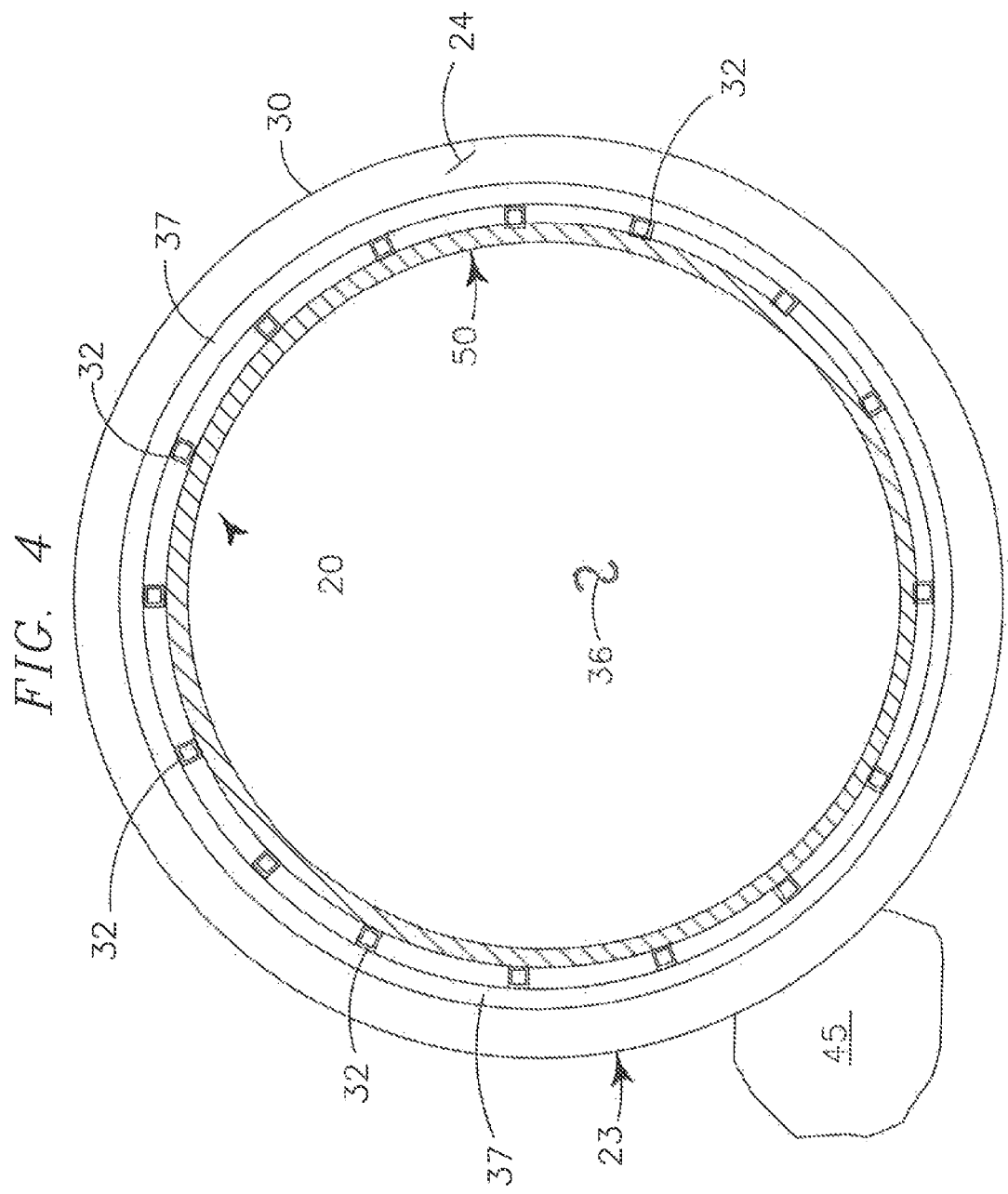
FIG. 4 is an orthographic plan view of a second embodiment of our containment structure having a cylindrical configuration.
Figure 5:
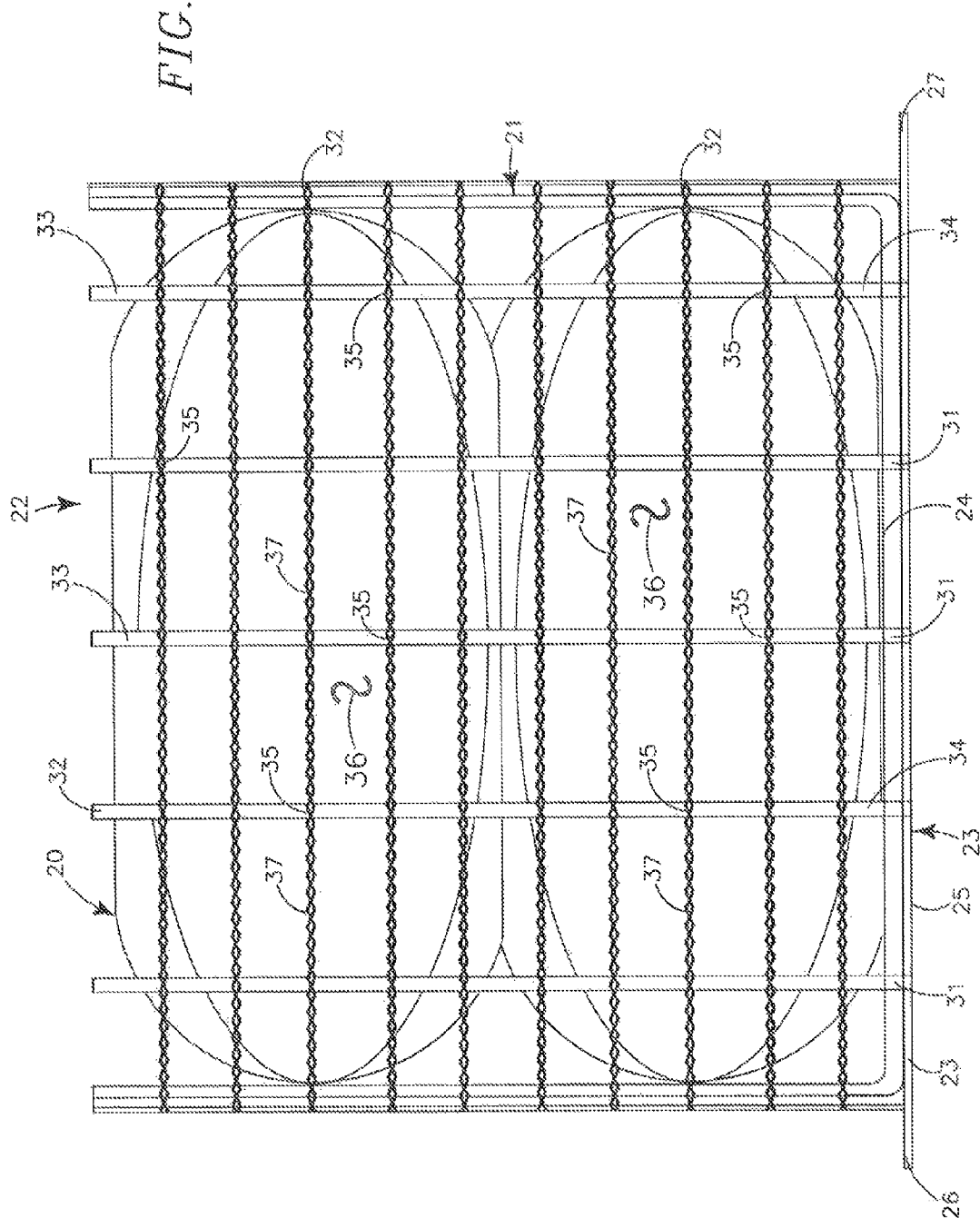
FIG. 5 is an orthographic side view of our containment structure, similar to that of FIG. 1, showing plural pillow tanks vertically stacked within the containment structure frame and chains for support straps.

The base frame 23, which may be a unitary frame, or assembled from interconnecting members, is assembled and/or positioned on the supporting surface 45, such as, but not limited to, the ground 45. Once the base frame 23 is assembled and/or positioned in the desired location, a plurality of vertical supports 32 are inserted into the support pockets 31 defined in the base frame 23. Although not shown in the Figures, it is contemplated the vertical supports 32 may be positionally secured within the support pockets 31 with securing means such as, but not limited to, pins, bolts, pegs, alignment grooves, key-ways or the like that simultaneously engage with both the base frame 23 and the vertical support 32 to prevent the vertical supports 32 from inadvertently disconnecting from or moving relative to the base frame 23. After the plurality of vertical supports 32 are engaged within the support pockets 31, a support band 37 is attached to the support strap connection 35 carried by each vertical support 32. The support band 37 extends around the plurality of vertical supports 32 and engages with the support strap connections 35 carried by each vertical support 32 so that the support band 37 extends around the entire perimeter of the base frame 23 to provide lateral support to the vertical supports 32 and the secondary containment 50 and the pillow tank 20. As shown in the Figures, a plurality of spacedly arrayed support bands 37 may be attached to the plurality of vertical supports 32 to provide additional strength and integrity to the containment frame 22. As shown in FIG. 2, support bands 37 may also extend across the open top portion of the containment frame 22 to provide additional support and strength to the containment frame 22.

The plurality of vertical supports 32, the support bands 37 and the top 24 of the base frame 23 define an open top volume 36 in which is carried the secondary containment 50 and the pillow tank 20.

Because fluid temperature is critical for effective fracking operations, a temperature moderator 21 may be carried by the containment frame 22 such as between the secondary containment 50 and the pillow tank 20 (FIG. 8) although other positions are also possible and anticipated. The temperature moderator 21 is anticipated to be, without limitation, a heating means to increase the temperature of fluid within the pillow tank 20 and/or an insulator to maintain the temperature of fluid within the pillow tank 20, and/or a cooling means to reduce the temperature of fluid within the pillow tank 20. One known device for providing heating and cooling and insulation is a thermoelectric cooler, also know as a Peltier device, which creates a temperature differential between opposing surfaces when an electrical current is passed through the Peltier device. Reversing the current flow changes the side of the Peltier device which is cool/hot and visa versa.

After the containment frame 22 is assembled as previously described, the secondary containment 50 is placed in the volume 36. In the preferred embodiment, the "open" top portion (not shown) of the secondary containment 50 has "lip portion" (not shown) that may be "folded over" the top end portions 33 of the vertical supports 32 and vertically upper most support band 37. The "lip portion" of the secondary containment 50 is positionally secured to the vertical supports 32 and/or the uppermost support bands 37 by known means, such as, but not limited to, releasable fasteners, clamps, bolts, and the like. If used, a temperature moderator 21, and appropriate circuitry (not shown) may be installed within the volume 46 defined by the secondary containment 50 to provide heating and/or cooling to the pillow tank 20.

The pillow tank 20 is thereafter positioned within volume 46 defined by the secondary containment 50 carried within the containment frame 22. Plumbing connections 47 and the like are interconnected with the pillow tank 20 valve structure (not shown) and extended out of the containment frame 22 so that any fluids within the pillow tank 20 may be accessed by means of the plumbing connections 47.

In the preferred embodiment the plumbing connections 47 do not extend through or otherwise transect or penetrate the secondary containment 50 to preserve the integrity and safety redundancy of the secondary containment 50. Instead, in the preferred embodiment the plumbing connections 47 extend vertically upwardly out of the secondary containment 50. (See FIG. 1). It is contemplated however, that in certain circumstances, the plumbing connections 47 may extend through or otherwise transect/penetrate the secondary containment 50 and a fluid tight seal around the plumbing connections 47 is established and maintained by fluid-tight seals. (not shown).

The above description has set out various features, functions, methods and other aspects of our invention. This has been done with regard to the currently preferred embodiments thereof. Time and further development may change the manner in which the various aspects are implemented.

The scope of protection accorded the inventions as defined by the claims is not intended to be limited to the specific sizes, shapes, features or other aspects of the currently preferred embodiments shown and described. The claimed inventions may be implemented or embodied in other forms while still being within the concepts shown, described and claimed herein. Also included are equivalents of the inventions which can be made without departing from the scope of concepts properly protected hereby.

Having thusly described and disclosed our MOVABLE REUSABLE CONTAINMENT STRUCTURE FOR FLEXIBLE FLUID CONTAINMENT VESSEL we file this Utility patent application and pray issuance of Utility Letters Patent.

We claim:

1. A containment structure for a flexible fluid containment vessel, comprising:
    a fluid containment vessel having a flexible side wall which is defined by a top and bottom surfaces, and a circumscribing sidewall, and wherein the fluid containment vessel when filled with a liquid orients the top surface a given height which is vertically above the bottom surface thereof;
    a non-rigid containment frame having a base frame which rests on an underlying supporting surface, and wherein the bottom surface of the fluid containment vessel rests on the base frame, and wherein the base frame is not transportable nor movable once the fluid containment vessel is filled with a liquid due to weight of liquid, and wherein the non-rigid containment frame further includes a plurality of spaced, vertically oriented supports which releasably cooperate with the base frame, and which further extends upwardly at least to a height which is equal to the height of the top surface of the fluid containment vessel, and wherein the respective vertically oriented supports each have a support strap connection which faces outwardly relative to each of the vertically oriented supports, and wherein the respective vertically oriented supports define an internal volume into which the fluid containment vessel is oriented, and at least partially enclosed;
    a supporting band circumscribing the plurality of vertically oriented supports, and which further cooperates with each of the vertical supports, and wherein the supporting band provides laterally disposed, outward support for each of the vertical supports, and further restricts movement of the vertically oriented supports laterally outwardly relative to the base frame; and
    a secondary, fluid impervious containment member which is received within the internal volume which is defined by the respective vertically oriented supports of the containment frame, and wherein the secondary, fluid impervious containment member is positioned between the bottom surface of the fluid containment vessel, and the base frame, and between the flexible circumscribing sidewall of the fluid containment vessel, and the respective vertical supports, and wherein the secondary, fluid impervious containment member extends to a height which is at least equal to the height of the top surface of the fluid containment vessel is above the bottom surface thereof.

2. The containment structure for a flexible fluid containment vessel, of claim 1 further comprising:
    a plumbing connection fluidically communicating with the flexible fluid containment vessel to move fluid into the flexible fluid containment vessel and to remove fluid from the flexible fluid containment vessel; and
    the plumbing connection fluidically communicating with the flexible fluid containment vessel does not transect the secondary, fluid impervious containment member.

* * * * *